United States Patent
Yotsumoto (10) Patent No.: US 8,031,803 B2
(45) Date of Patent: Oct. 4, 2011

(54) TRANSMITTER CAPABLE OF SUPPRESSING PEAK OF TRANSMISSION SIGNAL

(75) Inventor: Koji Yotsumoto, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 773 days.

(21) Appl. No.: 12/076,029

(22) Filed: Mar. 13, 2008

(65) Prior Publication Data

US 2008/0240287 A1  Oct. 2, 2008

(30) Foreign Application Priority Data

Apr. 2, 2007 (JP) ................. 2007-096015

(51) Int. Cl.
*H04K 1/02* (2006.01)
*H04L 27/00* (2006.01)
(52) U.S. Cl. ....................... 375/296; 375/295
(58) Field of Classification Search .................. 375/296, 375/295
See application file for complete search history.

(56) References Cited

U.S. PATENT DOCUMENTS

2006/0222056 A1\* 10/2006 Yotsumoto et al. ........... 375/149
2007/0217528 A1  9/2007 Miyoshi

FOREIGN PATENT DOCUMENTS

| JP | 2006-304191 | 11/2006 |
| WO | 2005/107118 | 11/2005 |
| WO | 2006/013693 | 2/2006 |

\* cited by examiner

*Primary Examiner* — David C. Payne
*Assistant Examiner* — Brian J Stevens
(74) *Attorney, Agent, or Firm* — Bacon & Thomas, PLLC (57) ABSTRACT

A transmitter capable of suppressing a peak of a transmission signal includes a frequency domain acquisition unit for obtaining a frequency domain signal from the signal for transmission; and a level control unit for controlling a level of the frequency domain signal obtained by the frequency domain acquisition unit to suppress a peak in a time domain transmission signal. Further, the transmitter includes a time domain conversion unit for converting the frequency domain signal into the time domain transmission signal whose level has been controlled by the level control unit; and a transmission unit for transmitting the time domain transmission signal.

2 Claims, 5 Drawing Sheets

TRANSMITTER CAPABLE OF SUPPRESSING PEAK OF TRANSMISSION SIGNAL

FIELD OF THE INVENTION

The present invention relates to a transmitter; and, more particularly, to a transmitter capable of effectively suppressing a peak signal.

BACKGROUND OF THE INVENTION

For example, in a wireless communications system, wireless signals are transmitted from a transmitter in a communication device for transmission and then received by a receiver of a communication device for reception.

Figure 1:
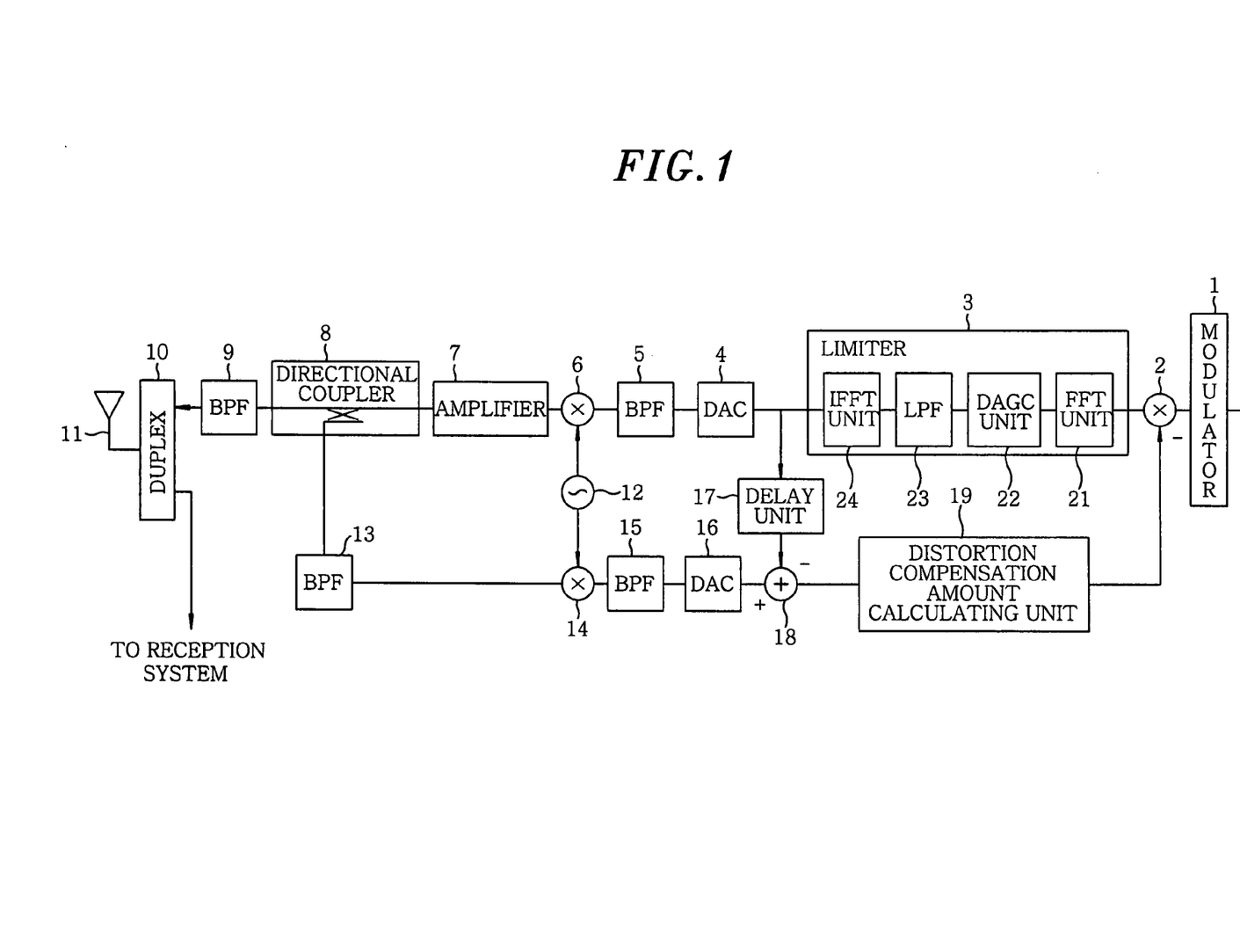
FIG. 1 illustrates a configuration of a transmitter in accordance with an embodiment of the present invention.
Figure 6:
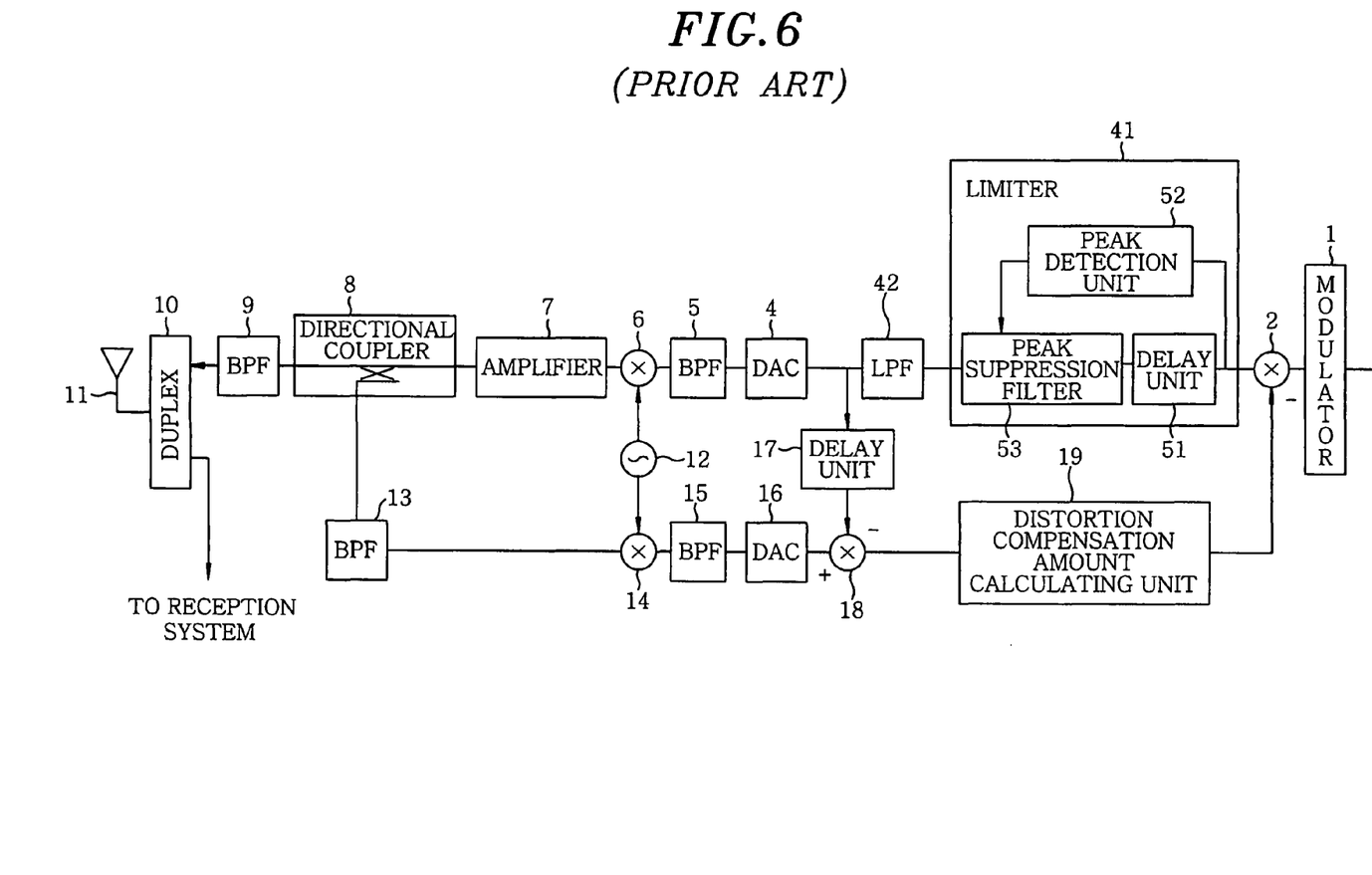
FIG. 6 is an exemplary configuration of a conventional transmitter.

FIG. 6 shows an exemplary configuration of a conventional transmitter. Herein, like parts as shown in FIG. 1, which will be described later in conjunction with an embodiment of the present invention, are designated by like reference numerals without limiting the scope of the present invention.

The transmitter shown in FIG. 6 has a limiter function for transmission signals and is capable of perform distortion compensation function for an amplifier 7.

As the distortion compensation for the amplifier 7, various methods to compensate distortion caused by the nonlinear characteristics of amplifiers may be used.

A limiter 41 and a LPF (Low Pass Filter) 42 different from those in FIG. 1 will now be described to explain a conventional method of peak suppression.

A modulated signal inputted from a modulator 1 to the limiter 41 via a multiplier 2 is delayed by a delay unit 51, and then is fed to both a peak suppression filter 53 and a peak detection unit 52. A peak of the modulated signal is detected by the peak detection unit 52, and the detection result thereof is sent to the peak suppression filter 53. Then, the modulated signal whose peak is suppressed by the peak suppression filter 53 based on the detection result is outputted to the LPF 42. Thereafter, an output signal from the LPF 42 is fed to a D/A (Digital to Analog) converter 4 and a delay unit 17.

Figure 7:
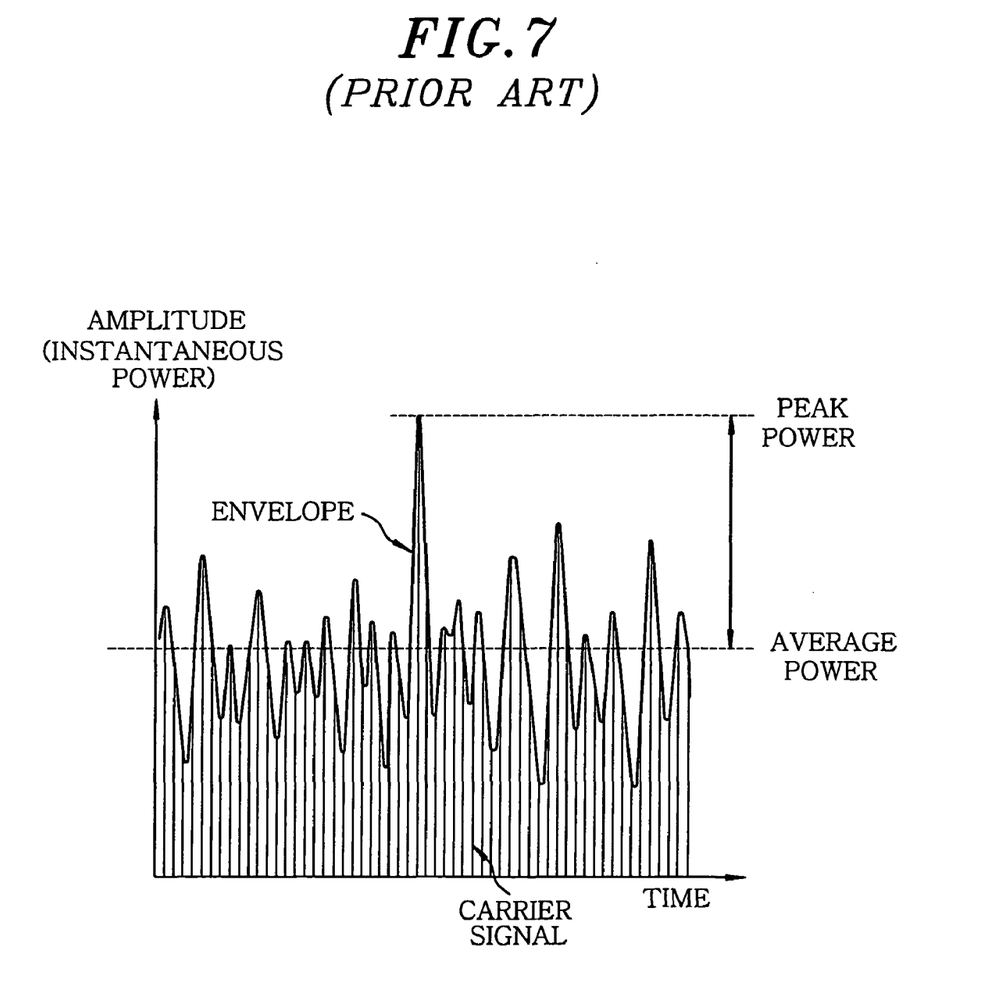
FIG. 7 is a view for describing a peak power.

Here, for example, according to a digital modulation/demodulation scheme with a non-constant envelope such as a QPSK (Quadrature Phase Shift Keying) scheme or a CDMA (Code Division Multiple Access) scheme, a peak may occur as shown in FIG. 7, which results in an amplifier distortion of the amplifier.

FIG. 7 schematically shows an exemplary carrier signal with a peak power. The horizontal axis indicates the time and the vertical axis indicates the amplitude (instantaneous power).

Further, FIG. 7 also shows the peak power and the average power.

In order to reduce such a peak as shown therein, a limiter for suppressing a peak component in the baseband or in the IF (Intermediate Frequency) band has been proposed, and has been used in the digital modulation/demodulation method with a non-constant envelope.

Meanwhile, frequency utilization efficiency is recently considered more important than amplifier efficiency. For example, it is not proper to use the conventional limiter for, e.g., a wideband CDMA scheme or to an OFDM (Orthogonal Frequency Division Multiplexing) scheme of high frequency efficiency, because the limiter may generate distortion to cause frequency interference, which significantly deteriorates wireless characteristics in the OFDM scheme. In such a case, a signal having an unsuppressed peak is inputted to the amplifier. To prevent this, a sufficiently large backoff is needed, which lowers the amplifier efficiency noticeably.

As a specific example, a mobile phone according to a PDC (Personal Digital Cellular) method as the second generation technology uses π/4 QPSK modulation and has the PAPR (Peak Average Power Ratio) of about 3 dB, whereas an OFDM modulated wave used in a wireless LAN (Local Area Network) or in a digital TV has a peak of 10 dB or more. Further, since the third (and later) generation mobile phone technology uses a wider band, it is expected that the PAPR will further increase.

(Patent Document 1) Japanese Patent Laid-open Application No. 2002-044054

As described above, there are demands for a transmitter having a limiter capable of suppressing a peak without generating frequency interference even for a high PAPR.

In response thereto, it has been suggested that the conventional limiter be improved to cope with a high PAPR. For example, in the transmitter shown in FIG. 6 suppresses a peak, and then the LPF 42 eliminates distortion. However, in this configuration since a peak may be further generated after a transmission signal passes through the LPF 42. To solve this problem, it has been proposed to provide a plurality of limiter 41 and a plurality of LPF 42 in a repetitive manner for performing the operations repeatedly.

However, the processing in this manner is too complicated, and it is difficult to install a transmitter with such a configuration.

SUMMARY OF THE INVENTION

In view of the above, the present invention provides a transmitter capable of effectively suppressing a peak signal, e.g., without causing frequency interference.

In accordance with an embodiment of the present invention, there is provided a transmitter capable of suppressing a peak of a transmission signal, including: a frequency domain acquisition unit for obtaining a frequency domain signal from the signal for transmission; a level control unit for controlling a level of the frequency domain signal obtained by the frequency domain acquisition unit to suppress a peak in a time domain transmission signal; a time domain conversion unit for converting the frequency domain signal into the time domain transmission signal whose level has been controlled by the level control unit; and a transmission unit for transmitting the time domain transmission signal.

In this configuration, since the level control to suppress the peak of the signal for transmission is performed in the frequency domain, the peak signal can be effectively suppressed without causing frequency interference.

Here, communications (transmission and reception) may be wireless or wired communications. Further, various communication schemes may be adopted. Furthermore, in order to obtain the frequency domain signal from the signal for transmission, for example, the time domain signal of the signal for transmission may be transformed into the frequency domain signal, or the frequency domain signal of the signal for transmission may be generated from the beginning.

Further, in order to control the level of the frequency domain signal to suppress the peak of the time domain signal, various methods may be used, e.g., the level of the entire frequency domain may be lowered in case of a peak occurrence.

To be more specific, for example, the level of the frequency domain signal may be detected and controlled to be equal to or less than a specific critical value (or below the specific critical value). Alternatively, the level of the time domain signal may be detected to control the level of the peak to be equal to or less than a specific critical value (or below the predetermined critical value). Alternatively, a PAPR may be detected and controlled to be equal to or less than a specific critical value (or below the specific critical value).

Further, it is possible to individually perform the steps of acquiring the frequency domain signal, controlling the level in the frequency domain, and converting the frequency domain signal into the time domain signal. Alternatively, the level may be controlled while the frequency domain signal is being obtained or while the frequency domain signal is being converted into the time domain signal.

An exemplary transmitter of the present invention has the following configuration.

Preferably, the frequency domain acquisition unit obtains the frequency domain signal from the signal for transmission by converting a time domain data signal corresponding thereto through a multi-stage FFT operation, the time domain acquisition unit converts the frequency domain transmission signal into the time domain transmission signal through a multi-stage IFFT operation, and the level control unit controls the level by adjusting a word length of a target signal at least one of positions located in front of a stage of the FFT operation subsequent to a second stage thereof, or located in front of a stage of the IFFT operation.

Thus, the peak signal can be effectively suppressed by controlling the word length during the FFT or IFFT operations.

Here, various methods may be used as the method for controlling the word length during the FFT or IFFT operations. For example, the effective word length is controlled to be equal to or less than a specific critical value (or below the specific critical value) so that the final word length as the result of the IFFT operations is made to be equal to a desired word length.

Further, the number of the stages for the FFT operations may be the same as that for the IFFT operations.

As described above, in accordance with the transmitter of the present invention, since the level control for suppressing a peak of a signal for transmission is performed in the frequency domain, the peak signal can be effectively suppressed without causing frequency interference.

BRIEF DESCRIPTION OF THE DRAWINGS

The features of the present invention will become apparent from the following description of a preferred embodiment given in conjunction with the accompanying drawings, in which.

DETAILED DESCRIPTION OF THE EMBODIMENTS

Hereinafter, a preferred embodiment of the present invention will be described with reference to the accompanying drawings, which form a part hereof.

FIG. 1 illustrates an exemplary configuration of a transmitter in accordance with the embodiment of the present invention.

The transmitter of this embodiment includes a modulator 1, a multiplier 2, a limiter 3, a D/A (Digital to Analog) converter 4, a BPF (Band Pass Filter) 5, a multiplier 6, an amplifier 7, a directional coupler 8, a BPF 9 and a duplexer 10. It further includes an antenna 11, an oscillator 12, a BPF 13, a multiplier 14, a BPF 15, an A/D (Analog to Digital) converter 16, a delay unit 17, an adder 18 and a distortion compensation amount calculating unit 19.

The limiter 3 is formed of a FFT (Fast Fourier Transform) unit 21, a DAGC (Digital Automatic Gain Control) unit 22, a LPF (Low Pass Filter) 23 and an IFFT (Inverse FFT) unit 24.

The transmitter of the embodiment has the function of limiting a transmission signal (the limiter 3) and the function of compensating a distortion of the amplifier 7 (the feedback system 2, 8 and 13 to 19).

Hereinafter, the operation of the transmitter in accordance with the embodiment will be described. First, a data signal for transmission is inputted to the modulator 1. The modulator 1 modulates the data signal and the modulated signal is fed to the multiplier 2. The multiplier 2 multiplies the modulated signal inputted from the modulator 1 by a distortion compensation coefficient signal inputted from the distortion compensation amount calculating unit 19, and the resultant signal is outputted to the FFT unit 21.

A fast fourier transform is performed on the signal inputted from the multiplier 2 by the FFT unit 21 in such a manner that the signal is converted from a signal in the time domain to a signal in the frequency domain, and the resultant signal is fed to the DAGC unit 22.

The level (i.e., the amplitude or the power in this example) of the signal inputted from the FFT unit 21 is adjusted by the automatic gain control (AGC) function of the DAGC unit 22, and the resultant signal is sent to the LPF 23.

Here, the DAGC unit 22 may be formed of, e.g., a variable attenuator or a variable amplifier.

The LPF 23 performs filtering of the signal inputted from the DAGC unit 22 and sends the resultant signal to the IFFT unit 24.

Thereafter, an inverse fast fourier transform is carried out on the signal inputted from the LPF 23 by the IFFT unit 24 so that the signal is converted from a signal in the frequency domain to a signal in the time domain, and the resultant signal is fed to the D/A converter 4 and the delay unit 17.

The D/A converter 4 converts the signal inputted from the IFFT unit 24 from a digital signal to an analog signal, and the resultant signal is outputted to the BPF 5.

The BPF 5 performs filtering of the signal inputted from the D/A converter 4 and sends the resultant signal to the multiplier 6.

The multiplier 6 multiplies the signal inputted from the BPF 5 with a signal inputted from the oscillator 12, and outputs the resultant signal to the amplifier 7. Thus, the transmission signal is frequency-converted (up-converted in this example the embodiment.

The signal inputted from the multiplier 6 is amplified by the amplifier 7 and then outputted to the directional coupler 8.

The directional coupler 8 feeds the signal inputted from the amplifier 7 to the BPF 9 and sends a part of the signal to the BPF 13.

The BPF 9 performs filtering of the signal inputted from the directional coupler 8 and outputs the resultant signal to the duplexer 10.

The duplexer 10 outputs the signal inputted from the BPF 9, i.e. the transmission signal, to the antenna 11, and sends a signal inputted from the antenna 11, i.e. a reception signal, to a reception system.

In this embodiment, detailed description of the reception system, i.e., a receiver, will be omitted.

The antenna 11 wirelessly transmits the signal inputted from the duplexer 10, i.e., the transmission signal, and it outputs a wirelessly received signal, i.e., the reception signal, to the duplexer 10.

The oscillator 12 generates a signal having a specific frequency and sends it to the multipliers 6 and 14.

The BPF 13 performs filtering of the signal inputted from the directional coupler 8 and outputs the resultant signal to the multiplier 14.

The multiplier 14 multiplies the signal inputted from the BPF 13 with the signal inputted from the oscillator 12 and outputs the resultant signal to the BPF 15. Thus, the feedback signal is frequency-converted (down-converted in this example).

The BPF 15 performs filtering of the signal inputted from the multiplier 14 and outputs the resultant signal to the A/D converter 16.

The A/D converter 16 converts the signal inputted from the BPF 15 from an analog signal to a digital signal and sends the resultant signal to the adder 18.

The delay unit 17 delays the signal inputted from the IFFT 24 and then sends the delayed signal to the adder 18. Here, the delay time is set to match the processing time in the feedback system.

The adder 18 subtracts the signal inputted from the delay unit 17, i.e. the transmission signal, from the signal inputted from the A/D converter 16, i.e. the feedback signal, by adding the inverse signal of the transmission signal to the feedback signal, and then outputs the resultant signal to the distortion compensation amount calculating unit 19.

The distortion compensation amount calculating unit 19 calculates the distortion compensation amount based on the signal inputted from the adder 18 and outputs to the adder 2 the distortion compensation coefficient signal to be used for distortion compensation according to the calculation result.

Next, the function of the limiter in accordance with the embodiment will be described in detail.

The limiter 3 has the FFT operation function for converting a time domain signal into a frequency domain signal (the FFT unit 21) and the IFFT operation function for performing the opposite conversion (the IFFT unit 24). Such functions can be implemented by using digital computing devices such as a DSP (Digital Signal Processor), a FPGA (Field Programmable Gate Array) and the like.

Further, in a transmitter of the communication system having a built-in function of IFFT operation as in an OFDM communication system, the FFT operation function of the FFT unit 21 may be omitted.

Figure 2A:
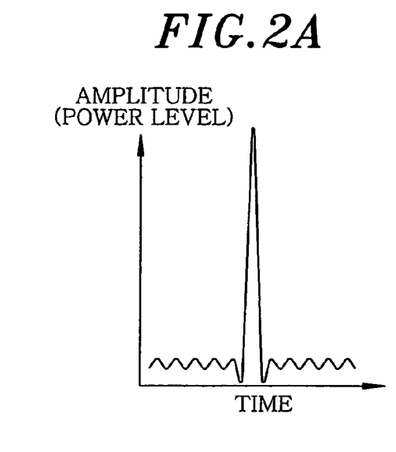
FIGS. 2A and 2B represent an example of the relationship between a peak signal in the time domain and in the frequency domain.
Figure 2B:
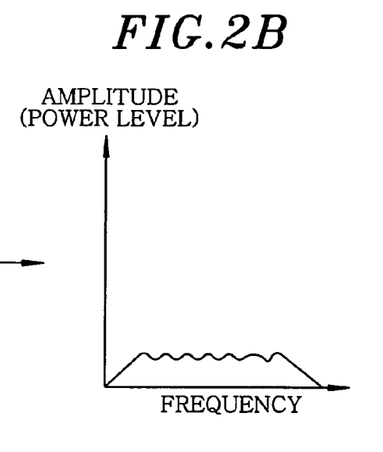

FIGS. 2A and 2B schematically show the relationship between a peak signal in the time domain and in the frequency domain.

FIG. 2A represents an exemplary peak signal in the time domain. The horizontal axis indicates the time and the vertical axis indicates the amplitude or the power level.

FIG. 2B represents the exemplary peak signal in the frequency domain. The horizontal axis indicates the frequency and the vertical axis indicates the amplitude or the power level.

As shown in therein, the peak signal in the time domain is spread out over the entire frequency range in the frequency domain.

Figure 3A:
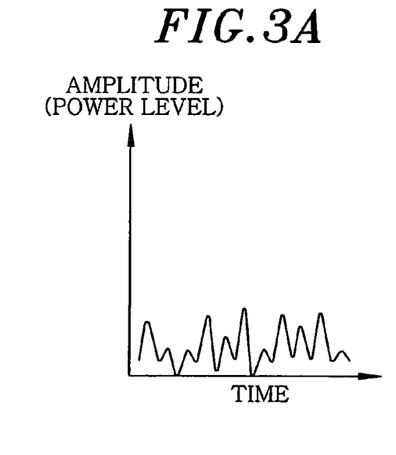
FIGS. 3A and 3B show an example of the relationship between a signal in the time domain and in the frequency domain in case of a low PAPR.
Figure 3B:
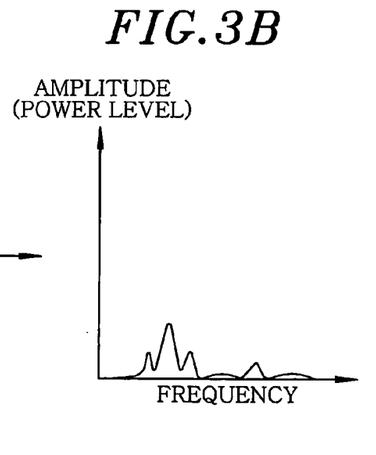
Figure 4A:
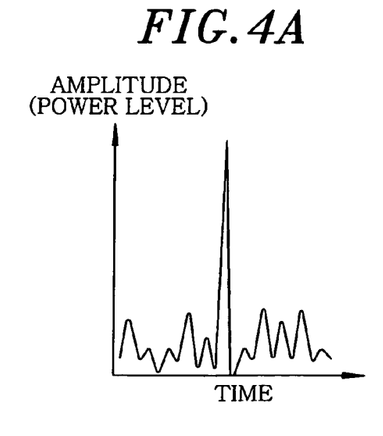
FIGS. 4A and 4B show an example of the relationship between a signal in the time domain and the signal in the frequency domain in case of a high PAPR.
Figure 4B:
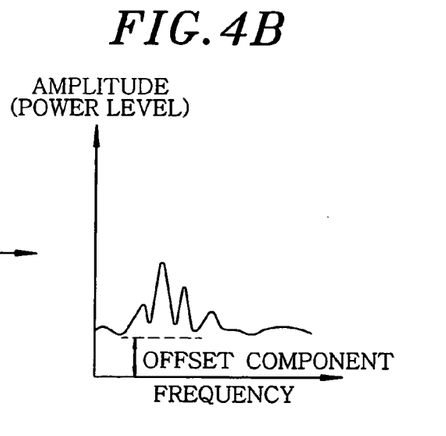

Further, it can be seen from the relationship shown in FIGS. 3A and 3B that, if a peak occurs in the signal, a constant component, i.e. an offset component is dominant in the frequency domain as shown in FIGS. 4A and 4B.

FIGS. 3A and 3B schematically show the relationship between the signal in the time domain and the signal in the frequency domain in case of a low PAPR.

FIG. 3A represents an exemplary signal in the time domain. The horizontal axis indicates the time, while the vertical axis indicates the amplitude or the power level.

FIG. 3B shows the exemplary signal in the frequency domain. The horizontal axis indicates the frequency, while the vertical axis indicates the amplitude or the power level.

On the other hand, FIGS. 4A and 4B schematically show the relationship between the signal in the time domain and the signal in the frequency domain in case of a high PAPR.

FIG. 4A represents an exemplary signal in the time domain. The horizontal axis indicates the time and the vertical axis indicates the amplitude or the power level.

FIG. 4B shows the exemplary signal in the frequency domain. The horizontal axis indicates the frequency and the vertical axis indicates the amplitude or the power level.

In this example, the gain control function (the DAGC unit 22) for uniformly lowering the level of the entire frequency domain is provided based on the above characteristics to thereby suppress the peak signal.

To be specific, if the level of the signal inputted from the FFT unit 21 is increased in the entire frequency domain due to an occurrence of the peak, the DAGC unit 22 in this example uniformly lowers the level of the signal in the entire frequency domain, i.e. the level of the offset component in the frequency domain as shown in FIG. 4B down to a specific level, for example.

Although the gain control function (the DAGC unit 22) is provided at the rear end of the FFT operation function (the FFT 21) in this example, the gain control function may also be built in the FFT unit 21 and/or the IFFT unit 22 for simplicity. In this case, for example, the effective word length is controlled not to exceed a specific length during the FFT/IFFT operations, so that the output word length of the IFFT operations is made to be equal to a desired quantization number.

Further, if the FFT/IFFT operations are realized as fixed-point operations, the level control can be implemented simply by prohibiting an overflow. In this case, for performing the gain control, a multiplier less than 1 may be indifferently multiplied at every point between each FFT/IFFT operation stage as shown in FIG. 5, or a right-shift operation is performed on the bits at every point.

Figure 5:
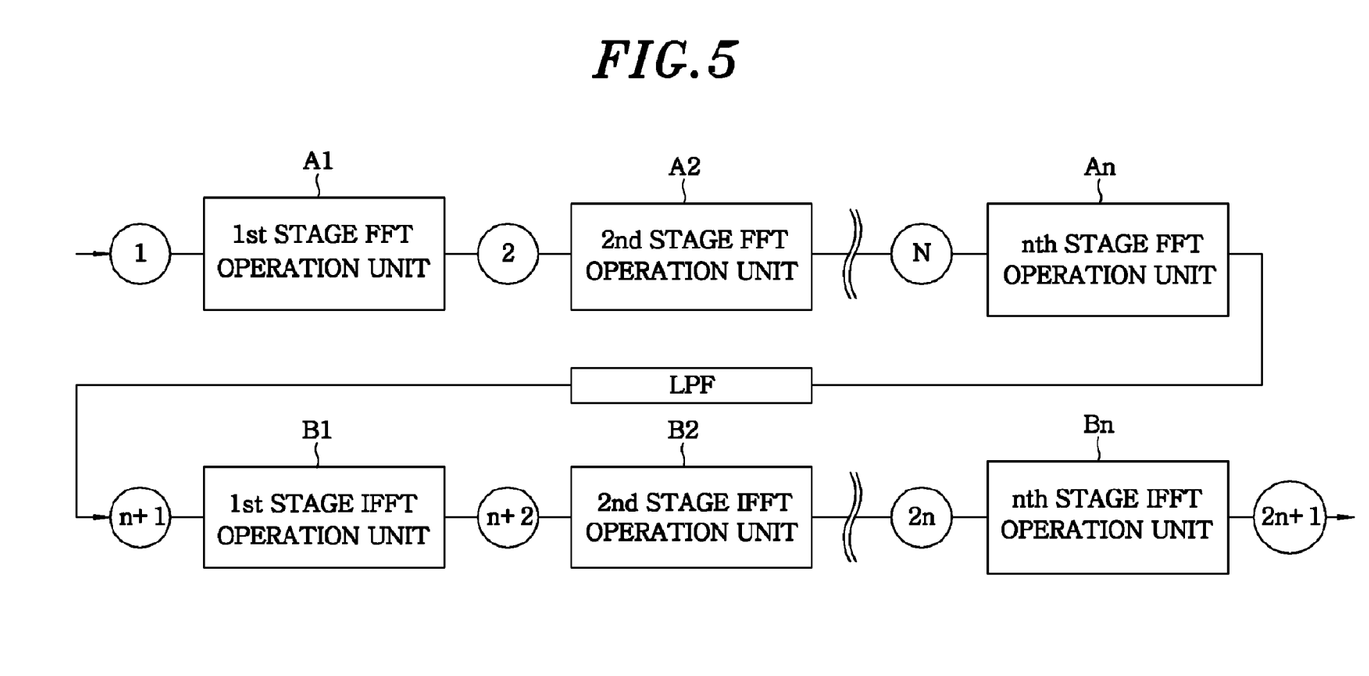
FIG. 5 illustrates a configuration of a gain controller in accordance with a modified example of the embodiment of the present invention.

FIG. 5 shows a configuration of a gain controller in accordance with a modified example of the limiter 3.

More specifically, a first to an nth stage FFT operation unit A1 to An, a LPF 31 and a first to an nth stage IFFT operation units B1 to Bn are connected in series.

The points 1 to n are located in front of the FFT operation units A1 to An, respectively; the points n+1 to 2n are located in front of the IFFT operation units B1 to Bn, respectively; and the point 2n+1 is located behind the final stage of the IFFT operation unit Bn.

A gain control points at which the signal gain is controlled may be inserted at any one of the points 1 to 2n+1 shown in FIG. 5. There is no particular limitation in the number or arrangement thereof and there may be a plurality of gain control points, for example.

The optimal PAPR can be obtained by adjusting the output word length to a desired word length.

It is more preferable that the gain control is performed at a point closer to the final stage as long as an overflow does not occur. By doing so, an error caused by rounding off in the FFT operations is reduced, and the dynamic range is less affected thereby.

In the present embodiment, the transmission signal is processed in the frequency domain by, e.g., transforming the transmission signal form the time domain to the frequency domain. Therefore, in accordance with the present embodiment, a digital LPF, which conventionally involves convolution operations, can be implemented simply by multiplications.

As described above, the transmitter in the embodiment has is capable of suppressing a peak signal occurring in the time domain by processing the signal in the frequency domain. More particularly, it retains the conversion function of transforming a time domain signal into a frequency domain signal and the gain control function of controlling the gain in the frequency domain.
Accordingly, a peak signal can be suppressed without causing frequency interference, whereby the PAPR of the transmission signal can be suppressed.

Therefore, in accordance with the transmitter of the embodiment, a peak signal can be easily suppressed by using the characteristics of the peak signal in the frequency domain, which makes it possible to suppress the PAPR while preventing the frequency interference. Further, the transmitter of the embodiment can be implemented only by a simple control such as prohibiting an overflow in the IFFT operations, so that an installation thereof becomes easier as well.

In this manner, in accordance with the embodiment, it is possible to realize a limiter capable of suppressing a peak by a simple method even for a high PAPR without generating frequency interference, thereby improving the amplifier efficiency. That is, the PAPR can be suppressed in the wideband modulation/demodulation method involving a non-constant envelope, which was not possible according to the prior art. Thus, distortion caused by nonlinear characteristics of an amplifier in a transmitter can be prevented, so that the amplifier efficiency can be enhanced.

In the transmitter of the embodiment as shown in FIG. 1, the FFT 21 serves as a frequency domain acquisition unit having the function of obtaining a frequency domain signal from a time domain signal; the DAGC unit 22 serves as a level control unit having the function of controlling a level in the frequency domain; the IFFT unit 24 serves as a time domain conversion unit having the function of converting a frequency domain signal to a time domain signal; and the processing units 4 to 11 serve as a transmission unit for transmitting a transmission signal obtained by the limiter 3.

Furthermore, as shown in FIG. 5, it is also possible that the level control is executed during the FFT or IFFT operation.

The configuration of the system or device of the present invention is not limited to those described above, and various modified configurations can be adopted. Moreover, it is also possible to provide a method or technique for performing the processes in the present invention, a program for performing the method or the technique, and a storage medium for storing the program in accordance with the present invention. Further, various other systems or apparatuses may also be provided in accordance with the present invention.

The present invention is not limited to the above described technical field, but it may also be applied to various other technical fields.

Further, the various processes performed by the system or device of the present invention may be controlled by a processor executing a control program stored in a ROM (Read Only Memory), e.g., in hardware resources having a processor or a memory. Further, for example, each function unit for executing each corresponding process may be configured as an individual hardware circuit.

Furthermore, the present invention may also be understood as a computer readable storage medium such as a floppy (registered trademark) disc and a CD (Compact Disc)-ROM containing the control program; or by the program itself. Therefore, by inputting the control program from the storage medium into a computer and executing the program using a processor, the processes of the present invention can be performed.

While the invention has been shown and described with respect to the preferred embodiment, it will be understood by those skilled in the art that various changes and modifications may be made without departing from the scope of the invention as defined in the following claims.

What is claimed is:

1. A transmitter capable of suppressing a peak of a transmission signal, comprising:
   a frequency domain acquisition unit for obtaining a frequency domain signal from the signal for transmission;
   a level control unit for controlling a level of the frequency domain signal obtained by the frequency domain acquisition unit to suppress a peak in a time domain transmission signal;
   a time domain conversion unit for converting the frequency domain signal into the time domain transmission signal whose level has been controlled by the level control unit; and
   a transmission unit for transmitting the time domain transmission signal, wherein the transmitter further comprises a D/A converter for converting the time domain transmission signal converted by the time domain conversion unit from a digital signal to an analog signal, a multiplier for frequency-converting the analog signal, and an amplifier for amplifying the frequency-converted signal by the multiplier,
   wherein the frequency domain acquisition unit obtains the frequency domain signal from the signal for transmission by converting a time domain data signal corresponding thereto through a multi-stage FFT operation, the time domain acquisition unit converts the frequency domain signal into the time domain transmission signal through a multi-stage IFFT operation, and the level control unit controls the level by adjusting a word length of a target signal at least one of positions located in front of a stage of the FFT operation subsequent to a second stage thereof, or located in front of a stage of the IFFT operation.

2. A transmitter capable of suppressing a peak of a transmission signal, comprising:
   a frequency domain acquisition unit for obtaining a frequency domain signal from the signal for transmission;
   a level control unit for controlling a level of the frequency domain signal obtained by the frequency domain acquisition unit to suppress a peak in a time domain transmission signal;

a time domain conversion unit for converting the frequency domain signal into the time domain transmission signal whose level has been controlled by the level control unit; and a transmission unit for transmitting the time domain transmission signal, wherein the frequency domain acquisition unit obtains the frequency domain signal from the signal for transmission by converting a time domain data signal corresponding thereto through a multi-stage FFT operation, the time domain acquisition unit converts the frequency domain signal into the time domain transmission signal through a multi-stage IFFT operation, and the level control unit controls the level by adjusting a word length of a target signal at least one of positions located in front of a stage of the FFT operation subsequent to a second stage thereof, or located in front of a stage of the IFFT operation.

* * * * *